United States Patent
Jabbar et al.

(10) Patent No.: US 9,560,548 B2
(45) Date of Patent: Jan. 31, 2017

(54) DYNAMIC ADJUSTMENT OF A WIRELESS NETWORK MEDIA ACCESS CONTROL PARAMETER

(71) Applicant: General Electric Company, Schenectady, NY (US)

(72) Inventors: Abdul Jabbar, Niskayuna, NY (US); Michael Joseph Dell'Anno, Niskayuna, NY (US); Marc Pearlman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 157 days.

(21) Appl. No.: 14/314,535

(22) Filed: Jun. 25, 2014

(65) Prior Publication Data
US 2015/0382231 A1 Dec. 31, 2015

(51) Int. Cl.
| | |
|---|---|
| *H04W 4/00* | (2009.01) |
| *H04W 28/02* | (2009.01) |
| *H04W 24/08* | (2009.01) |
| *H04W 74/08* | (2009.01) |
| *H04W 84/12* | (2009.01) |

(52) U.S. Cl.
CPC ......... *H04W 28/0268* (2013.01); *H04W 24/08* (2013.01); *H04W 74/0816* (2013.01); *H04W 84/12* (2013.01)

(58) Field of Classification Search
CPC .............................. H04W 28/02; H04W 24/08
USPC .................................. 370/230, 232, 235, 252
See application file for complete search history.

(56) References Cited

U.S. PATENT DOCUMENTS

| | | | |
|---|---|---|---|
| 5,638,371 A | 6/1997 | Raychaudhuri et al. | |
| 7,092,363 B1 | 8/2006 | Majidi-Ahy | |
| 7,463,578 B2 | 12/2008 | Iwamura et al. | |
| 7,583,645 B2 | 9/2009 | Qi et al. | |
| 8,401,021 B2 | 3/2013 | Buga et al. | |
| 8,509,129 B2 | 8/2013 | Deb et al. | |
| 8,634,447 B2 | 1/2014 | Diener et al. | |
| 2005/0157676 A1* | 7/2005 | Kwak | H04W 28/14 370/328 |
| 2007/0105575 A1* | 5/2007 | Sampath | H04W 52/243 455/509 |
| 2007/0206547 A1 | 9/2007 | Gong et al. | |
| 2011/0182171 A1 | 7/2011 | McNew et al. | |
| 2013/0244719 A1 | 9/2013 | Nukala et al. | |
| 2013/0286868 A1 | 10/2013 | Oyman et al. | |
| 2014/0022932 A1* | 1/2014 | Park | H04W 36/14 370/253 |

(Continued)

OTHER PUBLICATIONS

PCT Search Report and Written Opinion issued in connection with corresponding Application No. PCT/US2015/035295 on Sep. 10, 2015.

(Continued)

*Primary Examiner* — Farah Faroul
(74) *Attorney, Agent, or Firm* — Pabitra K. Chakrabarti

(57) ABSTRACT

According to some embodiments, information associated with collisions occurring as packets are exchanged through a wireless network may be measured. At least one media access control parameter may then be automatically and dynamically adjusted to achieve a throughput requirement, at a relatively low latency, while reducing collisions in the wireless network.

13 Claims, 7 Drawing Sheets

(56) References Cited

U.S. PATENT DOCUMENTS

2015/0131435 A1* 5/2015 Kasslin ................ H04W 84/12
370/230
2015/0195198 A1* 7/2015 Shin ................... H04L 61/6009
370/392

OTHER PUBLICATIONS

Chapter 5, "Energy-efficient wireless communication", Second IEEE International Workshop on Wireless Mobile ATM Implementations (wmATM'99), 1999 [32], Journal on Mobile Networks and Applications (MONET), 2000, [33], 70 pages.

* cited by examiner

DYNAMIC ADJUSTMENT OF A WIRELESS NETWORK MEDIA ACCESS CONTROL PARAMETER

BACKGROUND

Some embodiments of the present invention relate generally to communications in a wireless local area network (WLAN) and, more particularly, to the dynamic adjustment of wireless communications protocol parameters for meeting quality of service (QoS).

The Institute of Electronic and Electrical Engineers (IEEE) 802.11 standard for wireless LANs is a popular mechanism for setting up networks in many industrial, office, home, and medical environments. The IEEE 802.11 protocol includes a media access control (MAC) layer for controlling wireless communication. The basic 802.11 MAC layer uses a Distributed Coordination Function (DCF) to share the wireless medium between multiple nodes in the WLAN. DCF relies on carrier sense multiple access with collision avoidance (CSMA/CA) and optional 802.11 request to send/clear to send (RTS/CTS) to share the medium between nodes. The main limitation of the legacy 802.11 is that it cannot support Quality of Service differentiation among different types of traffic. That is, every type of traffic is treated with equal fairness in the network. This attribute is adequate for best effort traffic, but for delay and throughput sensitive traffic such as real time video, a prioritization framework is needed with high priority traffic getting a larger share of the shared wireless medium. Note that bandwidth is lowered primarily due to back-offs and not collisions, which are prevented partially by CSMA and RTS/CTS.

To provide such QoS differentiation, the original 802.11 MAC defines another coordination function called the point coordination function (PCF). When nodes are connected to the network through an access point (AP), the AP sends "beacon" frames at regular intervals (usually every 0.1 second). Between these beacon frames, PCF defines two periods: a contention free period (CFP) and a contention period (CP). In the CP, DCF is used. In CFP, the AP sends contention free-poll (CF-Poll) packets to each station, one at a time, to give them the right to send a packet. The AP is the coordinator. Such an approach may allow for a better management of the QoS. Note that the PCF has limited support, does not define classes of traffic, and needs central coordination, which may not be suitable in highly dynamic environments.

Since the legacy 802.11 does not have adequate support for QoS, a new standard called 802.11e provides prioritized traffic delivery for differentiating between traffic at different levels of criticality. The new standard achieves QoS by having separate MAC parameters for different service classes. That is, the 802.11e enhances the DCF and the PCF, through a new coordination function: the hybrid coordination function (HCF). Within the HCF, there are two methods of channel access, similar to those defined in the legacy 802.11 MAC: HCF controlled channel access (HCCA) and enhanced distributed channel access (EDCA). Both EDCA and HCCA define traffic classes (TC). For example, emails might be assigned to a low priority class, and voice over WLAN (VOWLAN) might be assigned to a high priority class.

With EDCA, 802.11e achieves QoS differentiation by having different MAC parameters (TXOP, CW, AIFS, RL) for different traffic classes. A transmit opportunity (TXOP) is a bounded time interval during which a station can send as many frames as possible (as long as the duration of the transmissions does not extend beyond the maximum duration of the TXOP). If a frame is too large to be transmitted in a single TXOP, it is fragmented into smaller frames. Additionally, EDCA includes access categories and multiple independent back-off entities for accessing each channel, including: a contention window size (CWmin) for each class, an arbitration interframe space (AIFS), and a frame retransmission limit (RL). Using different MAC parameters for low and high priority traffic classes, higher priority traffic may be given more opportunities to transmit as compared to lower priority traffic.

The HCCA hybrid coordinator function (HCF) controlled channel access is similar to PCF in legacy 802.11. However, in contrast to PCF (where the interval between two beacon frames is divided into two periods of CFP and CP), HCCA allows for CFPs being initiated at almost any time during a CP (called a controlled access phase (CAP) in 802.11e), allowing more control for different traffic classes. A CAP is initiated by the hybrid coordinator (HC), which may be the AP, when it wants to send a frame to a station, or receive a frame from a station, in a contention free manner. HCCA also defines new traffic streams (TS) in addition to traffic class (TC), which makes it possible to control QoS for traffic sessions at each node and affect individual packet queues. This means that the HC is not limited to per-station queuing and can provide a kind of per-session service. The HC can coordinate these streams or sessions in any fashion it chooses by giving information about the lengths of their queues for each TC. The HC can use this info to give priority to one node over another, or better adjust its scheduling mechanism. Additionally, nodes are given a TXOP: they may send multiple packets in a row, for a given time period selected by the HC. With the HCCA, QoS-enabled nodes also have the ability to request specific transmission parameters (data rate, jitter, etc.), which allow applications like VoIP and video streaming to work more effectively on a Wi-Fi network.

Even though 802.11e can differentiate between the service classes, under standard operating conditions the 802.11e parameters are static in nature, meaning that it is not optimal under all network conditions. When network conditions in the WLAN change, the 802.11e parameters do not adapt to those changing conditions. Moreover, the default parameters for the different traffic classes are meant to specifically support Best Effort, Video and Voice traffic only. This makes the 802.11e default parameters unsuitable for some applications. For example, due to the static nature of its parameters, the 802.11e default parameters are unsuitable with respect to meeting the QoS requirements of medical devices used in patient monitoring in a hospital environment, where threshold levels of signal throughput and signal delay may be required.

Therefore, it would be desirable to design an apparatus and method that allows for the dynamic adjustment of MAC parameters for meeting a QoS requirement. It would also be desirable for the system and method to allow for automatically setting the MAC parameters in a distributed manner, using only local knowledge obtained at the individual node and for the MAC parameters to be based on an individual node's QoS requirements.

BRIEF DESCRIPTION

According to some embodiments, information associated with collisions occurring as packets are exchanged through a wireless network may be measured. At least one media access control parameter may then be automatically and dynamically adjusted to achieve a throughput requirement, at a relatively low latency, while reducing collisions in the wireless network.

Other embodiments are associated with systems and/or computer-readable medium storing instructions to perform any of the methods described herein.

DRAWINGS

DETAILED DESCRIPTION

Figure 1:
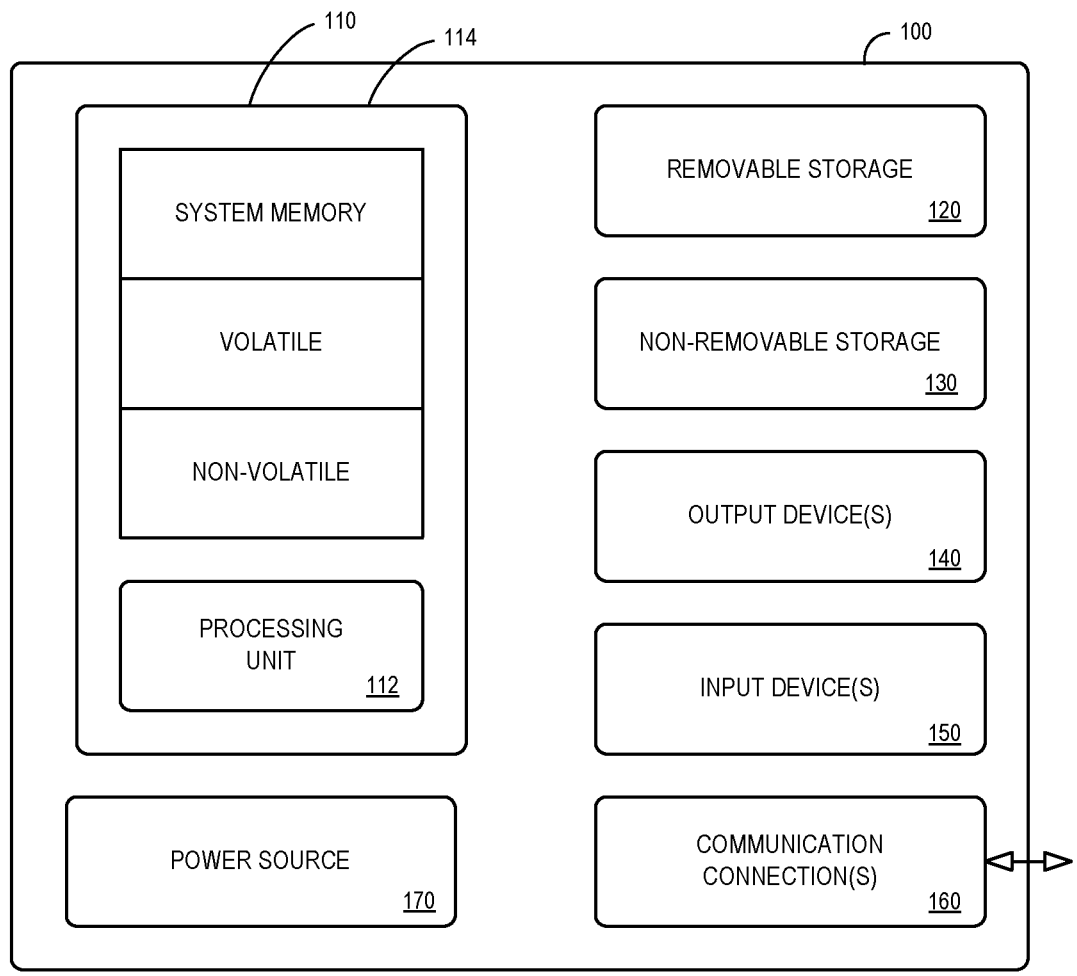
FIG. 1 is a block schematic diagram of a wireless local area network (WLAN) node in accordance with some embodiments.

Referring to FIG. 1, an example of a suitable node 100 on which the invention may be implemented is shown. The node 100 is only one example of a suitable computing environment and is not intended to suggest any limitation as to the scope of use or functionality of the invention. Neither should the node 100 be interpreted as having any dependency or requirement relating to any one or combination of components illustrated in the exemplary node 100.

A computing device, such as the node 100 illustrated in FIG. 1, may be associated with a user station or node in the form of a wireless mobile device. As will be explained in greater detail below, the node 100 is set up for access to a wireless local area network (WLAN). In its most basic configuration, the node 100 includes at least a processing unit 112 and a memory 114. Depending on the exact configuration and type of computing device, the memory 114 may be volatile (such as RAM), non-volatile (such as ROM, flash memory, etc.) or some combination of the two. The processing unit 112 and memory 114 are included in, and form part of, a controller 110.

The node 100 may also have additional features/functionality. For example, the node 100 may also include additional storage (removable and/or non-removable) including, but not limited to, magnetic or optical disks or tapes. Such additional storage is illustrated in FIG. 1 by a removable storage 120 and a non-removable storage 130. Computer storage media includes volatile and nonvolatile, removable and non-removable media implemented in any method or technology for storage of information such as computer readable instructions, data structures, program modules or other data. The node 100 may also contain one or more communications connections 160 that allow the node to communicate with other devices. The communications connection 160 provides for communication with a WLAN via, for example, acoustic, RF, infrared and other wireless media. As discussed above, the term computer readable media as used herein includes both storage media and communication media.

The node 100 may also have one or more input devices 150 such as a keyboard, a computer mouse, a pen, a voice input device, a touch-input device, etc. The input devices 150 may also include analog or digital signal inputs. One or more output devices 140 such as a display, speakers, a printer, etc. may also be included. The node 100 may also be provided with a portable power source 170, such as a battery pack or the like. The power source 170 may provide power for computations and wireless data transmissions by the node 100.

Figure 2:
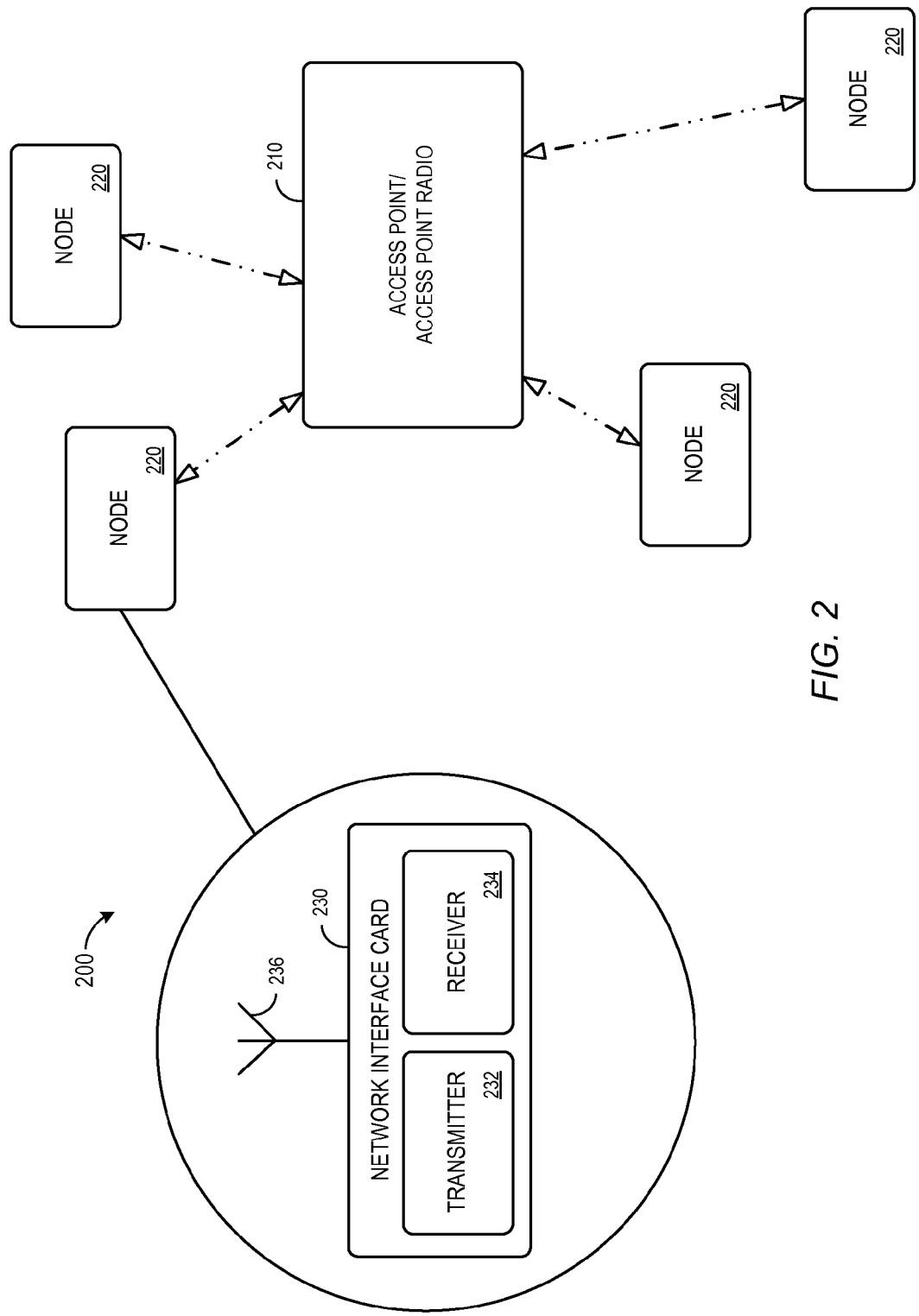
FIG. 2 is a block schematic diagram of a node connected to a WLAN according to some embodiments.

Referring now to FIG. 2, each node 220 in a system 200 may further include a network interface card (NIC) 230 for wirelessly communicating with different types of wireless networks. The NIC 230 includes a transmitter 232, which is coupled to an antenna 236 for transmitting data wirelessly over a suitable frequency channel. A receiver 234 is also coupled to the antenna 236 for receiving communication packets wirelessly transmitted from the networks. The network interface module 230 and the antenna 236 may be part of the communication connections 160 in FIG. 1. In one embodiment, the NIC 230 employs wireless configuration service over IEEE 802.11e wireless connections to ease network configuration, including infrastructure networks and ad hoc networks. An exemplary network interface card is a PCMCIA or PCI wireless card for general purpose systems or a SDIO card for embedded systems.

Through the wireless NIC 230, each node 220 may communicate with different types of wireless networks. For instance, in the illustrated environment of FIG. 2, each node 100 comprises part of a WLAN (along with additional nodes 220) and is connected wirelessly to the WLAN through one or more access point radios (i.e., access points) 210 therein. The node 100 may be in a state of searching for devices that belong to the network by periodically scanning actively by sending probe requests and scanning for probe response signals transmitted by the access point. Alternatively, node 100 may search passively by scanning for beacons transmitted by the access point 210.

According to some embodiments, a computer implemented process/technique may provide QoS differentiation in the WLAN. In an exemplary embodiment, the technique may be directed to an adaptation of at least one parameter of the MAC layer of an 802.11e implementation of a WLAN. For example, the technique might provide updates to the contention window (CW) parameter that alters a size of the CW according to a required QoS for each node/device. An adaptive method for determining a CW is desirable because the size limits on the CW affects WLAN system efficiency as a function of the number of transmissions attempted over a channel. If a channel is crowded, meaning that the channel is busy with devices attempting transmissions, a small fixed CW value results in a too small period of opportunity for all the devices to transmit. A small fixed CW results in collisions that waste spectrum efficiency. An increase in the CW decreases the collision probability. Also, the time cost of waiting is much smaller than the cost of collision plus back-off period. However, when a WLAN system contains only a few devices, the collision probability is quite low. Accordingly, a CW value that is too large requires a device to wait unnecessarily to transmit a frame. A decrease in the CW may expedite the data transmission and increase system throughput. Therefore, depending on the number of devices at any given time and the potential for collisions, the proper CW for efficient transmission can change over time. An adaptive CW calculation is, therefore, preferred.

While described and shown with respect to the adaptation of a CW size in a MAC layer, it is also envisioned that other or additional MAC parameters could be modified rather than the CW. Additionally, it is further envisioned that embodiments could be applied to other wireless communication protocols beyond 802.11e, such as updated 802.11 protocols (e.g., 802.11n).

According to an embodiment of the invention, an adaptive CW calculation on a per-node/wireless device level is implemented as a distributed type of control for a WLAN, thus ensuring QoS for each node in the WLAN, the QoS defining a throughput level and time delay in packet transmission that are desired for wireless transmission for that node. The controller in each node 100 may be configured to perform a distributed and adaptive algorithm for adapting CW sizes that works under the framework of the 802.11e standard for WLAN and uses local computations to dynamically select 802.11e operating parameters to satisfy the QoS requirements (i.e., throughput and delay), as set forth in detail below. In the distributed control scheme, the controller in each of node in a WLAN separately applies the technique based on its individual view of the WLAN operating conditions. That is, based on local measurements acquired at each node, and based on each node's QoS requirements, each node determines the appropriate adaptation of its CW size that allows it to satisfy its own QoS requirements.

Figure 3:
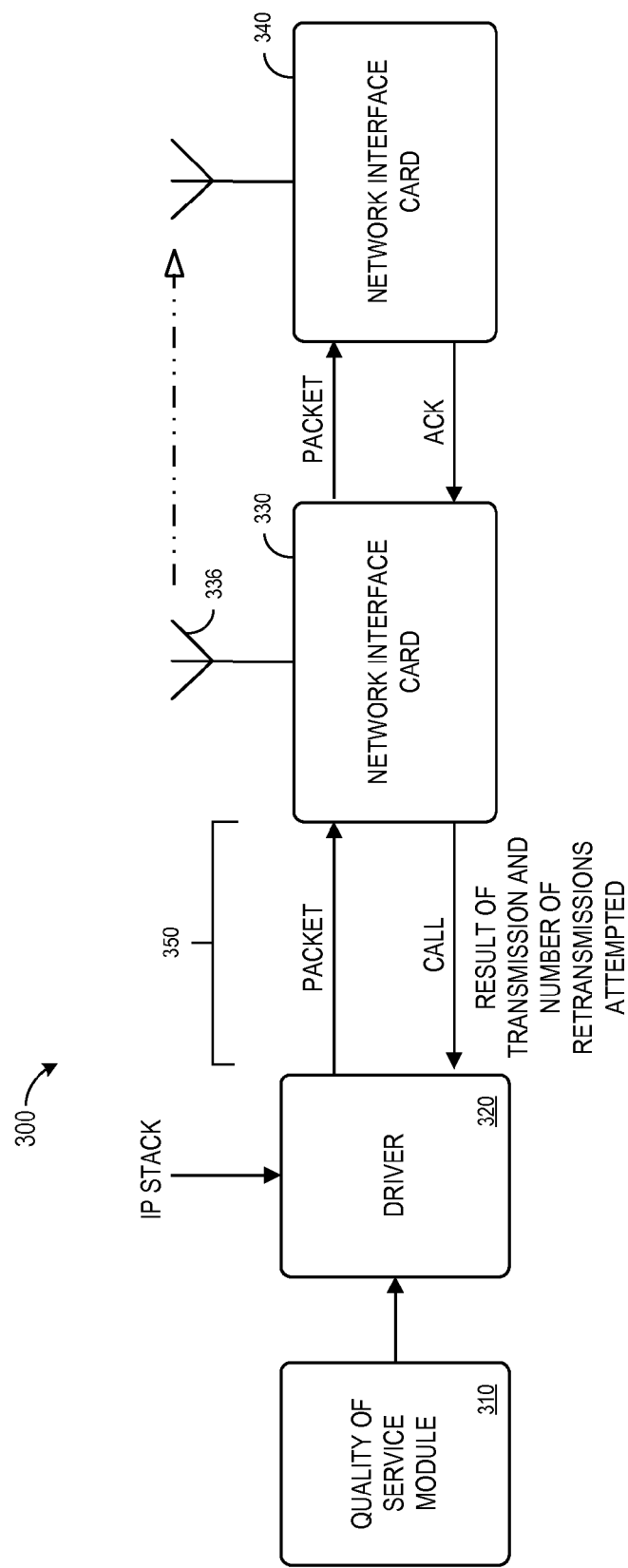
FIG. 3 illustrates components of a WLAN node in accordance with some embodiments.

FIG. 3 illustrates a system 300 including components of a WLAN node in accordance with some embodiments. Note that the collision probability may be derived by a quality of service module 310 (e.g., including collision measurement and automatic adjustment modules) from an average packet retransmission rate, and an average packet retransmission rate may be derived based on the number of retries-per-packet that are reported (in call back messages) by the originating node NIC as illustrated by FIG. 3. According to some embodiments, an IP stack sends a data packet to a driver 320, which then forwards the packet to the originating node's NIC 330. The originating node's NIC 330 wirelessly transmits the packet via an antenna 336 to a remote node's NIC 340. Upon successful receipt of the packet, the remote node's NIC 340 acknowledges the receipt of the packet by sending a message (ACK) back to the originating NIC 330. If this acknowledgement is not received by the originating NIC 330, it assumes that the packet was lost and retries the transmission. The originating NIC 330 will retransmit a pre-configured number of times before giving it up. When the originating NIC 330 either succeeds or gives up in sending the packet, it sends a call 350 back to the driver 320 with the result, as well as the number of times that the packet needed to be retransmitted by the originating node's NIC 330 before it was successfully received by the remote node's NIC 340. According to some embodiments, the system 300 may further measure how many packets are acknowledged in a given period of time, as well as the size of those packets, to calculate throughput. Similarly, the system 300 may measure the times between packets being sent and associated acknowledgements being received to calculate latency. These values may then be used, for example, in connection with a simple gradient descent algorithm.

Figure 4:
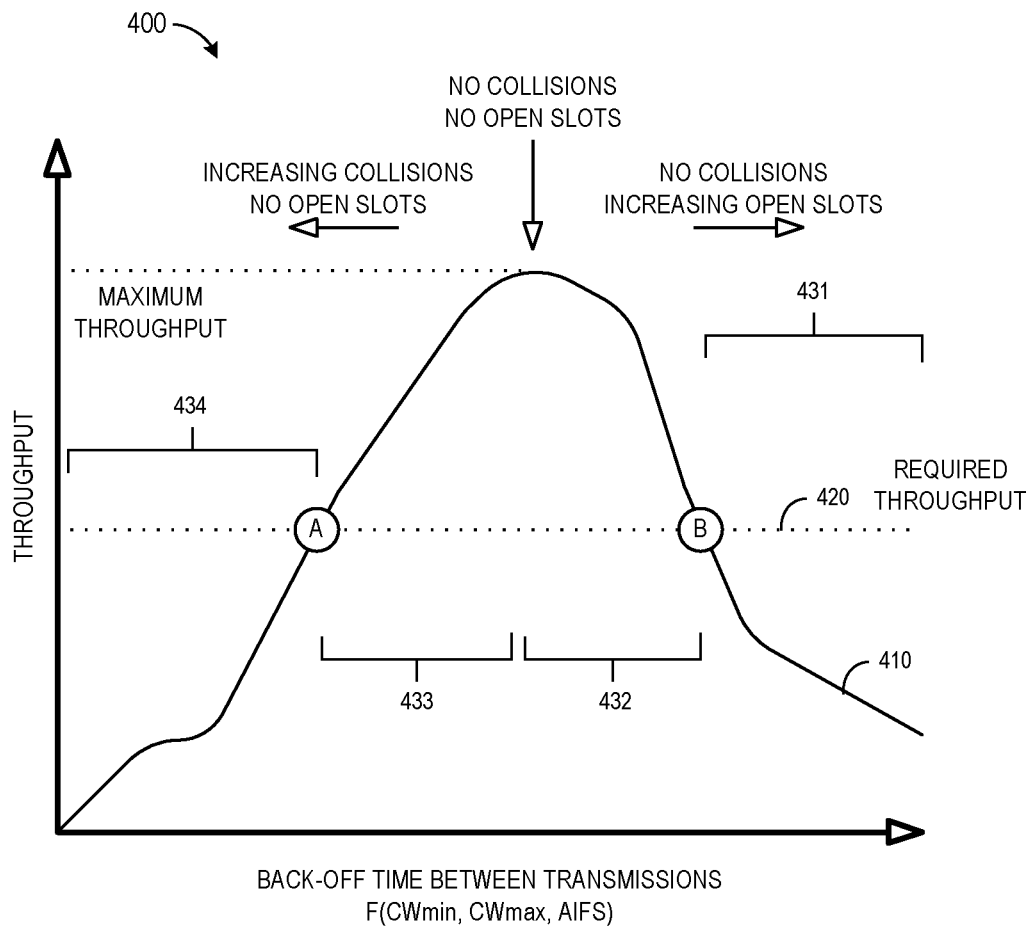
FIG. 4 is a graph illustrating a relationship between network throughput and back-off times.

By way of example, FIG. 4 is a graph 400 illustrating a relationship between network throughput and back-off times. In the network context described herein, some embodiments may provide a method to meet the QoS requirements for a plurality of priority classes by making the back-off time a function of both the minimum and maximum values of the contention window (CW) and the arbitration inter-frame space (AIFS) time, and adjusting the back-off time between transmissions by using a searching technique such as, for example, a gradient descent algorithm. Some embodiments may include: over-riding the gradient descent algorithm in a region of the back-off time between transmissions; adjusting the throughput to produce the collision adjusted throughput; and searching for a collision adjusted throughput that reaches the required throughput for the network.

As illustrated in FIG. 4, the throughput versus back-off time will, in theory, be characterized as a curve 410 comprising four distinct regions:

Region 1: This is the region 431 (to the right of point B on the curve 410) where the throughput is below the required throughput 420 and where the number of unused slots increases as the back-off time is increased.

Region 2: This is the region 432 (between point B and the maximum throughput on the curve 410) where the throughput is above the required throughput 420 and where the number of unused slots increases as the back-off time is increased.

Region 3: This is the region 433 (between the maximum throughput and point A on the curve 410) where the throughput is above the required throughput 420 and where the number of collisions increases as the back-off time is decreased (reducing throughput).

Region 4: This is the region 434 (to the left of point A on the curve 410) where the throughput is below the required throughput 420 and where the number of collisions increases as the back-off time is decreased.

Figure 5:
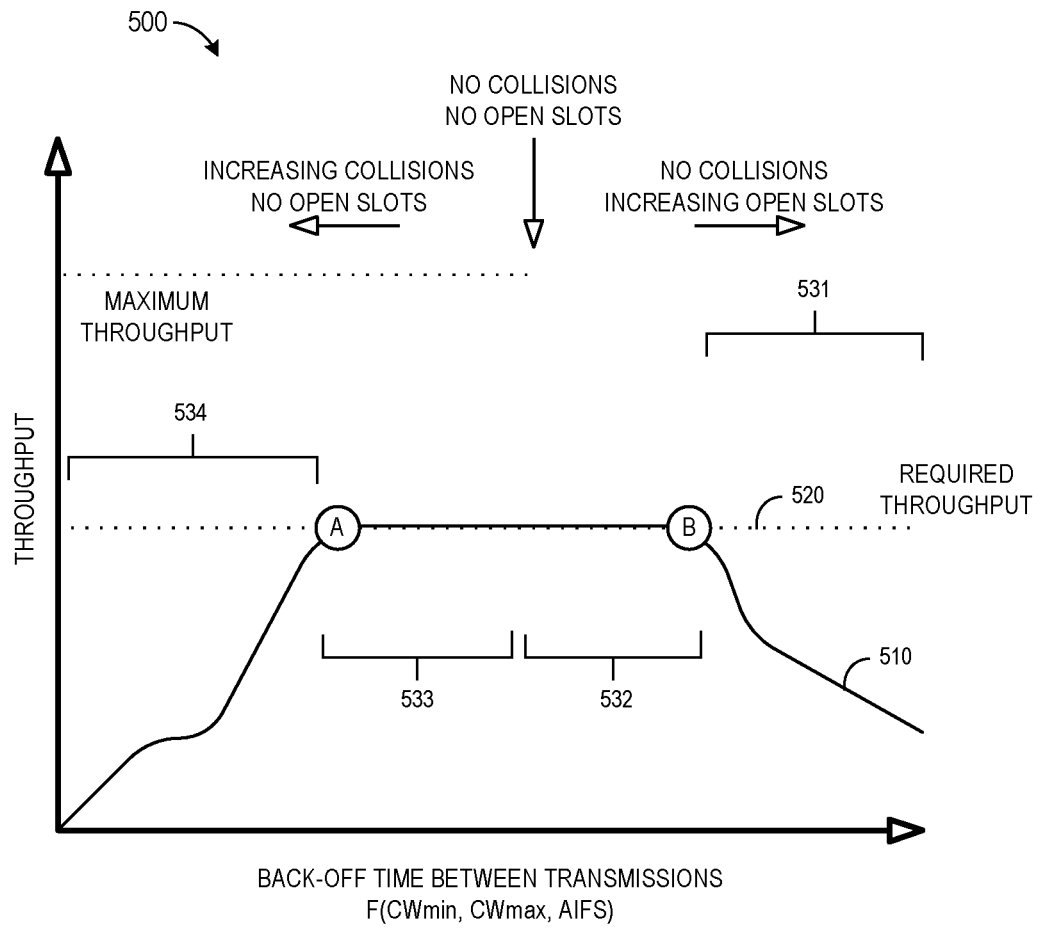
FIG. 5 is a graph illustrating an actual relationship between network throughput and back-off times.

Region 2 is further separated from Region 3 at the point where there are no collisions or unused slots (and maximum throughput is achieved). The hump between points A and B as shown in FIG. 4 is only observable if the offered load (traffic) is greater than the required throughput. However, in normal practice, the offered load will not exceed the required throughput, in which case the hump between points A and B cannot be realized. Instead, the observed throughput will remain essentially flat between points A and B as indicated by the graph 500 in FIG. 5 having a curve 510 that is essential flat between points A and B. Note that four regions 531, 532, 533, 534 may correspond to the regions 431, 432, 433, 434 of FIG. 4, respectively. The problem to be solved is the adjustment of the back-off time between transmissions such that the required throughput 520 will be met with fewer collisions to reduce latency. A basic difficulty in trying to adjust the back-off time between transmissions when there is a flat region in the throughput curve 510 is that there is no gradient to drive the adjustment. In order to proceed, a "collision adjusted throughput" may be calculated as a function of the collision rate. For example, the collision adjusted throughput might be calculated as the throughput multiplied by (1+collision probability) or (1+a re-transmit ratio).

Figure 6:
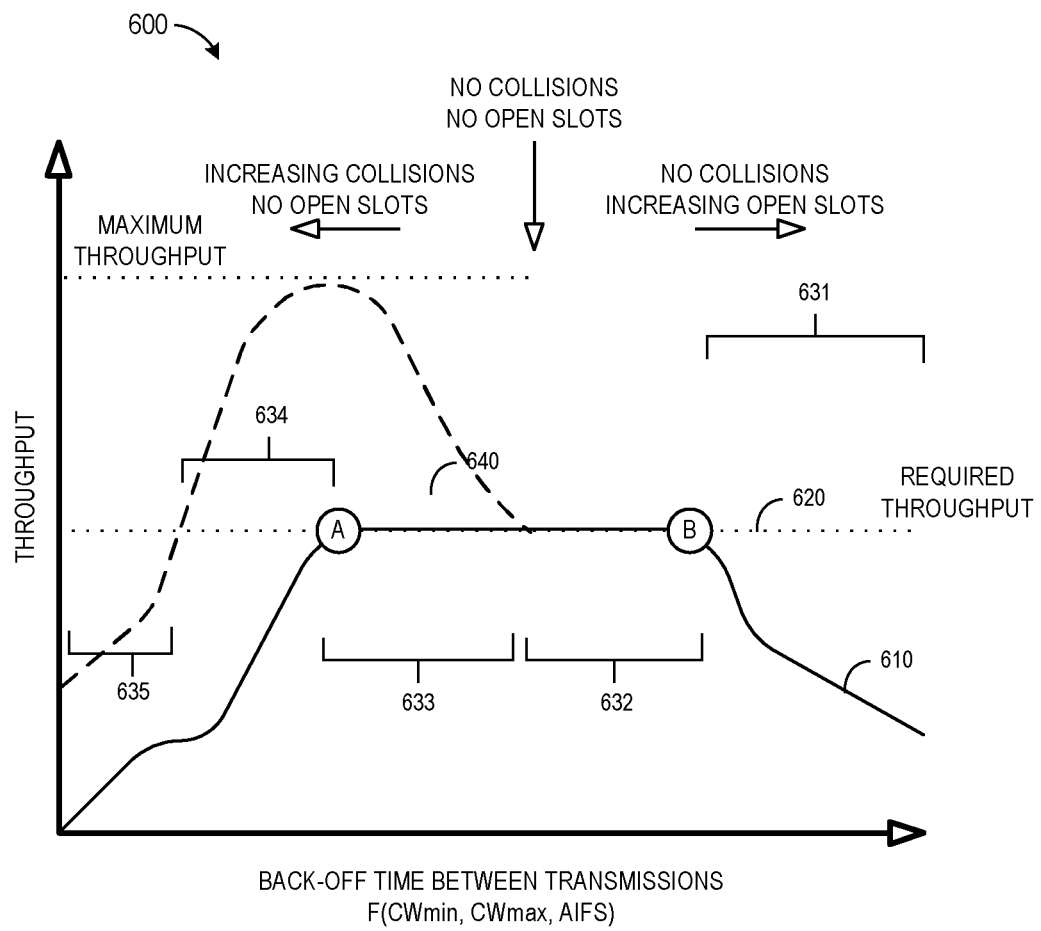
FIG. 6 is a graph illustrating collision adjusted throughput according to some embodiments.

FIG. 6 is a graph 600 illustrating the relationship between throughput and back-off time as a curve 610 with a required throughput 620. Note that regions 631, 632, and 633 correspond to the similar regions described with respect to FIGS. 4 and 5. Regions 634 and 635 correspond to regions 434, 435 in FIGS. 4 and 5, respectively. According to some embodiments, a collision adjusted throughput 640 is used to adjust the back-off time between transmissions in order to achieve the required throughput with a relatively low latency. Note that the throughput 610 has an essentially flat segment between points A and B because the offered load does not typically exceed the required throughput 620. By overlaying the graph of the collision adjusted throughput 640, however, at least some of the following four distinguishable regions enable the use of gradient descent algorithm:

Region 1: This is the region 631 (to right of point B) where the throughput is below the required throughput 620 and where the number of unused slots increases as the back-off time is increased.

Region 2: This is the region 632 (between the point at which there are both no collisions and no open slots and point B) where the throughput is at the required throughput and where the number of unused slots increases as the back-off time is increased.

Region 3: This is the region 633 (between point A and the point at which there are both no collisions and no open slots) where the throughput is at the required throughput and where the number of collisions increases as the back-off time is decreased, and also where the collision adjusted throughput decreases as the back-off time is increased.

Region 4: This is the region 634 (between point A and where required throughput and collision adjusted throughput intersect) between the peak collision adjusted throughput and the point at which collision adjusted throughput meets required throughput.

Region 5: This is the region 635 (to the left of where required throughput and collision adjusted throughput intersect) where the collision adjusted throughput is below the required throughput.

According to some embodiments, a goal is to set the back-off time between transmissions such that collisions are avoided. As noted above, this cannot be done by a usual gradient descent approach on the simple throughput 610. However it can be done by increasing the back-off time between transmissions until the collision adjusted throughput 640 meets the required throughput indicating a collision-free situation.

When the originating node starts in region 5 or 3, it may change the back-off time until an optimal point is achieved, such as when no collisions and no unused slots are being observed. When the originating node starts in region 1, it may change the back-off time until point B is reached on the curve 610. When the originating node starts in region 2, it may remain at the starting point as that represents an optimal solution. When the originating node starts in region 4, it may override the gradient descent approach (or even move the back-off value in a direction opposite to that suggested by the gradient descent approach). According to some embodiments, the algorithm finds a feasible region where achieved throughput is equal to required throughput, within an acceptable bound, and the collisions are essentially zero (within an acceptable bound). Another way to interpret the algorithm is to note that the algorithm has each node use just enough time slots (air time) so as to achieve the required throughput without wasting any slots on collisions.

Figure 7:
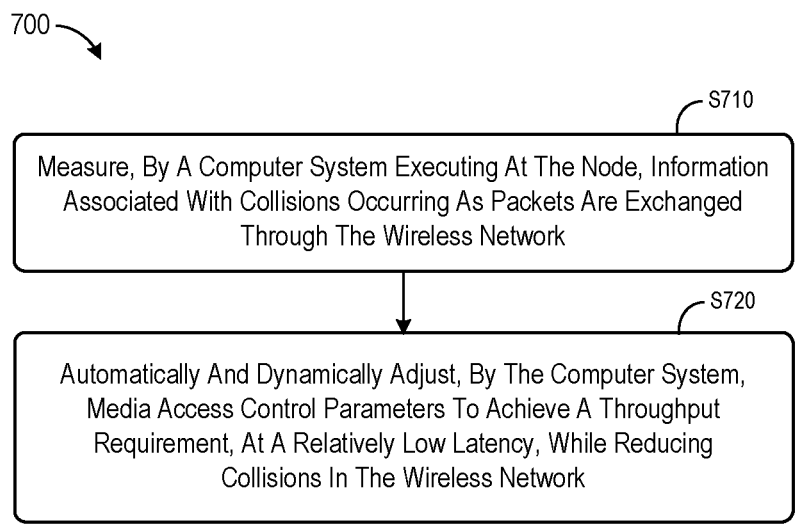
FIG. 7 is a flow chart of a method associated with a wireless network in accordance with some embodiments.

FIG. 7 is a flow chart of a method 700 associated with a wireless network in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S710, a computer system executing at a node in a WLAN may measure information associated with collisions occurring as packets are exchanged through the wireless network (such as an 802.11e wireless network). According to some embodiments, at least one MAC parameter may be initialized (e.g., upon node startup) based on historical information associated with the wireless network At S720, the computer system may automatically and dynamically adjust at least one MAC parameter to achieve a throughput requirement, at a relatively low latency, while reducing collisions in the wireless network (e.g., associated with region 533 of FIG. 5). The MAC parameter may be associated with a back-off time between transmissions, such as a minimum CW value, a maximum CW value, and/or an AIFS time. According to some embodiments, the adjusting of S720 is associated with a "collision adjusted throughput value," which adds collisions/re-retransmissions to the normal throughput value. Moreover, the adjusting may be performed using a gradient descent algorithm over the collision adjusted throughput curve unless the collision adjusted throughput value is greater than the throughput requirement but less than the maximum throughput. In such a case, wherein the collision adjusted throughput is greater than the required throughput but less than the maximum throughput (e.g., region 634 of FIG. 6), embodiments may override the use of the gradient descent algorithm (e.g., by moving the back-off time in the directions opposite to the one suggested by the algorithm). According to some embodiments, the adjusting of S720 includes limiting an amount of adjustment to reduce transient instability effects (e.g., when a metal door is opened).

Thus, some embodiments may provide an efficient and accurate way to dynamically adjust at least one MAC parameter for a WLAN.

In one application of the invention, it is envisioned that the adaptive CW calculation on a per-node level set forth above can be implemented in hospital networks involving patient monitoring over WLANs. A number of medical devices in such a setting would be required to meet QoS (throughput and delay) thresholds and have these QoS metrics guaranteed, as the wireless traffic from these devices includes critical patient data. For example, wireless devices such as DASH, CITRIX, and voice-over IP devices may have such QoS requirements. Since the traffic consists of extremely critical patient data, QoS metrics may need to be guaranteed in such an environment.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method associated with an individual node in a wireless network, comprising:
   measuring, by a computer system executing at the individual node, information associated with collisions occurring as packets are exchanged through the wireless network; and
   automatically and dynamically adjusting, by the computer system, at least one media access control parameter to achieve a throughput threshold requirement associated with the individual node and a delay threshold requirement associated with the individual node, while reducing collisions and reducing latency in the wireless network, wherein said adjusting is associated with a collision adjusted throughput value calculated as a throughput multiplied by (1+collision probability) or (1+a re-transmit ratio), and further wherein said adjusting is performed using a gradient descent algorithm and the collision adjusted throughput value unless the collision adjusted throughput value is greater than the throughput requirement but less than a maximum throughput.

2. The method of claim 1, wherein the at least one media access control parameter is associated with a back-off time between transmissions.

3. The method of claim 2, wherein the wireless network comprises an 802.11e wireless network.

4. The method of claim 3, wherein the at least one media access control parameter is associated with at least one of: (i) a minimum contention window value, (ii) a maximum contention window value, and (iii) an arbitration inter-frame space time.

5. The method of claim 1, wherein the at least one media access control parameter is initialized based on historical information associated with the wireless network.

6. A non-transitory, computer-readable medium storing instructions that, when executed by a computer processor, cause the computer processor to perform a method associated with an individual node in a wireless network, the method comprising:

measuring information acquired at the individual node and associated with collisions occurring as packets are exchanged through the wireless network; and automatically and dynamically adjusting at least one media access control parameter to achieve a throughput threshold requirement associated with the individual node and a delay threshold requirement associated with the individual node, while reducing collisions and reducing latency in the wireless network, wherein said adjusting is associated with a collision adjusted throughput value calculated as a throughput multiplied by (1+collision probability) or (1+a re-transmit ratio), and further wherein said adjusting is performed using a gradient descent algorithm and the collision adjusted throughput value unless the collision adjusted throughput value is greater than the throughput requirement but less than a maximum throughput.

7. The medium of claim 6, wherein the at least one media access control parameter is associated with a back-off time between transmissions.

8. The medium of claim 7, wherein the wireless network comprises an 802.11e wireless network.

9. The medium of claim 8, wherein the at least one media access control parameter is associated with at least one of: (i) a minimum contention window value, (ii) a maximum contention window value, and (iii) an arbitration inter-frame space time.

10. A system associated with an individual node in a medical wireless network, comprising:

a network interface card associated with the individual node and configured to wirelessly communicate with different types of wireless networks;

a driver associated with the individual node and configured to:
receive at least one data packet from an IP stack,
forward the at least one data packet to the network interface card, and
receive at least one call back message from the network interface card; and a quality of service module associated with the individual node and the driver card and configured to derive a collision probability associated with the individual node based on the at least one call back message, the quality of service module comprising:

a collision measurement module that measures information acquired at the individual node and associated with collisions occurring as packets are exchanged through the medical wireless network; and an automatic adjustment module that automatically and dynamically adjusts at least one media access control parameter to achieve a throughput threshold requirement associated with the individual node and a delay threshold requirement associated with the individual node, while reducing collisions and reducing latency in the medical wireless network, wherein said quality of service module is further associated with a collision adjusted throughput value calculated as a throughput multiplied by (1+collision probability) or (1+a re-transmit ratio), and further wherein said automatic adjustment module automatically and dynamically adjusts said at least one media access control parameter using a gradient descent algorithm and the collision adjusted throughput value unless the collision adjusted throughput value is greater than the throughput requirement but less than a maximum throughput.

11. The apparatus of claim 10, wherein the at least one media access control parameter is associated with a back-off time between transmissions.

12. The medium of claim 11, wherein the medical wireless network comprises an 802.11e wireless network.

13. The apparatus of claim 12, wherein the at least one media access control parameter is associated with at least one of: (i) a minimum contention window value, (ii) a maximum contention window value, and (iii) an arbitration inter-frame space time.

* * * * *